Figure 1:
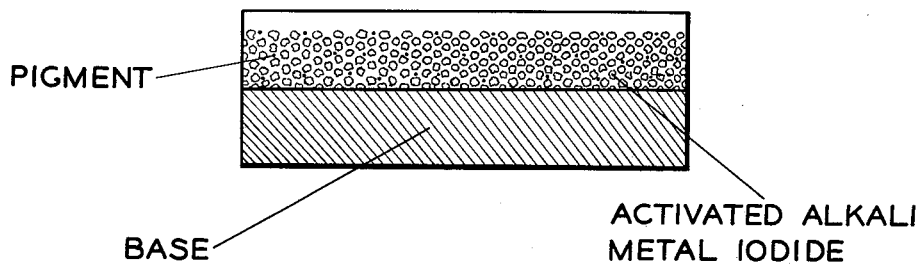

Feb. 27, 1962    G. B. DE LA MATER ETAL    3,023,313
METHOD OF MAKING AN X-RAY IMAGE INTENSIFYING
SCREEN AND RESULTING ARTICLE
Filed Oct. 13, 1958

George B. De La Mater
Douglas W. Chapman
Inventors
Koenig, Pope, Senniger and Powers
Attorneys

United States Patent Office 3,023,313
Patented Feb. 27, 1962

3,023,313
METHOD OF MAKING AN X-RAY IMAGE INTENSIFYING SCREEN AND RESULTING ARTICLE
George B. De La Mater, St. Johns, and Douglas W. Chapman, Florissant, Mo., assignors to Mallinckrodt Chemical Works, St. Louis, Mo., a corporation of Missouri
Filed Oct. 13, 1958, Ser. No. 766,676
17 Claims. (Cl. 250—80)

This invention relates to X-ray intensifying screens for use in radiography.

This application is a continuation-in-part of our copending application, Serial No. 647,990, filed March 25, 1957, now abandoned.

Briefly, the present invention is directed to improved X-ray intensifying screens comprising a sheet of substantially X-ray transparent supporting material and a fluorescent coating therefor, the said coating comprising a compact layer of discrete particles of an activated alkali metal iodide having interspersed therein a finely ground pigment with a refractive index not less than 1.7 and low absorptivity for light in the blue-violet-ultraviolet region of the spectrum. The coating comprises a major proportion of the activated alkali metal iodide and a minor proportion but not less than 3%, based upon the weight of the iodide, of the pigment. The invention is also directed to the method of making improved intensifying screens which comprises coating a sheet of the supporting material with a suspension of a mixture of the above activated iodide and pigment in a liquid vehicle comprising an organic polymeric binder and an inert organic solvent for the binder, the dry volume of the polymeric binder being insufficient to fill the voids in a dry mixture of the iodide and pigment, allowing a portion of the solvent to evaporate from the coating, applying successive coatings of an organic polymer in a like manner until it completely fills the interstices between the particles of iodide and pigment, and thereafter applying a thin film of a substantially water-impermeable polymeric material to protect the underlying fluorescent coating against air and moisture.

The use of intensifying screens in medical radiography is well known and likewise the construction of such screens using calcium tungstate or similar fluorescent materials is also well known. The advantages of using activated alkali metal iodides in place of calcium tungstate are disclosed in the copending application of Michel Ter-Pogossian, Serial No. 592,479 filed June 20, 1956 and now Patent No. 2,968,725. While the activated alkali metal iodides are appreciably sensitive to moisture and oxidizing agents and would presumably be impractical for the manufacture of durable and useful screens, it has been shown that such screens can be fabricated by simple and economical methods analogous to those used in fabricating calcium tungstate screens by choosing a suitable binder and by taking certain precautions during the manufacture of the screens.

Activated iodide screens are highly advantageous for medical radiography. They require only ¼ to ⅙ as much radiation to give a photographic image of the same density as that obtained using a calcium tungstate screen of the type most commonly used, and only ⅖ the radiation required by even the fastest screens previously available. The iodide screens are also more efficient than calcium tungstate or other types of conventional screens for use in conjunction with iodine-containing contrast agents.

In order to obtain screens having maximum speed, it was proposed to use a polymeric binder having a refractive index as nearly like that of the salt as possible, whereby a fluorescent coating is obtained which is substantially transparent to the light emitted by the fluorescent salt. The quality of the photographic image obtained using such screens is generally quite good and is satisfactory for many purposes. On close examination, however, a slight blurring of the image is quite noticeable. While the blurring is not usually sufficient to obscure any but the finest details, it can be quite annoying to a radiologist who must examine the photographs closely and who is accustomed to sharp and clear resolution of all visible details.

Among the objects of the present invention may be noted the provision of improved X-ray intensifying screens of the type in which the fluorescent substance is an activated alkali metal iodide; the provision of iodide screens which are capable of sharply resolving fine details without substantial sacrifice of the speed characteristic of the iodide screens previously known; the provision of iodide screens of the character described which have substantially improved resistance to atmospheric moisture; and the provision of methods for fabricating improved X-ray intensifying screens. Other objects and features of the invention will be in part apparent and in part pointed out hereinafter.

The invention accordingly comprises the products and methods hereinafter described, the scope of the invention being indicated in the following claims.

Figure 2:
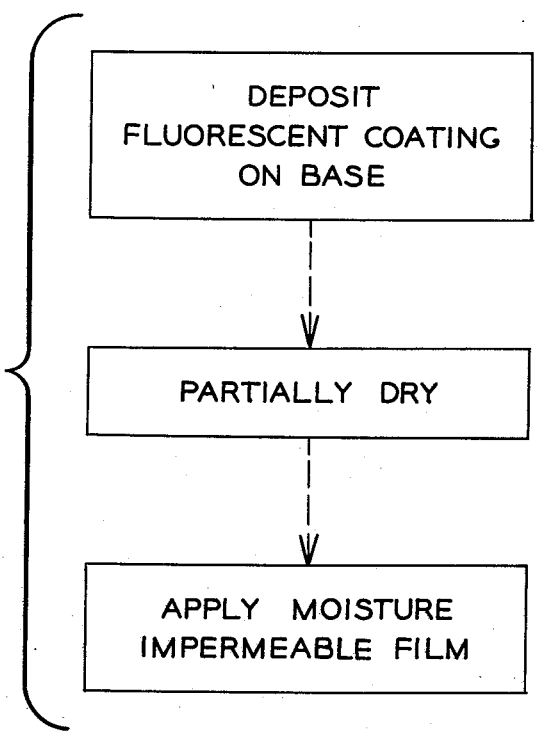

In the accompanying drawings, in which one of various possible embodiments of the invention is illustrated, FIG. 1 is a section on a greatly enlarged scale through a screen, and FIG. 2 is a flow sheet of the process.

In accordance with the present invention it has been found that the blurring of the photographic image can be eliminated with surprisingly little loss in the speed of the screen by including in the fluorescent coating a small amount of a finely ground pigment or pigments whose refractive indices are at least 1.7 and which have low absorptivity for light in the blue-violet-ultraviolet region of the spectrum.

There are numerous pigments which possess the foregoing characteristics and can be used for the present invention. It is preferable, although not always essential, for the pigment to be substantially transparent to X-rays so as not to reduce the amount of radiation available to the activated iodide. Thus, while certain lead and barium pigments have satisfactory reflectivity, their opacity to X-rays limits their usefulness. On the other hand, calcium tungstate has been successfully used as the pigment. In that case, the fluorescence of the tungstate partially compensates for any reduction in the amount of radiation reaching the iodide and the resulting screens are nearly as fast as unpigmented screens and give sharp resolution of fine details. Fluorescent barium lead sulfate and fluorescent zinc sulfide may be similarly used.

Titanium dioxide and zirconium dioxide have been found to be among the most useful pigments for improving resolution since they do not materially interfere with the X-rays and have high refractive indices. Zirconium dioxide provides as sharp resolution as titanium dioxide and in addition is less absorptive for ultraviolet light. Zirconium dioxide is therefore the preferred pigment for inclusion in the fluorescent coating. In the case of titanium dioxide, two forms are available, the rutile and anatase forms. Of these, anatase has been found to give faster screens because it absorbs less ultraviolet light. Where titanium dioxide is used as the reflecting pigment, the anatase form is preferred. Calcium titanate, zinc oxide, and magnesium oxide are examples of other pigments useful for the purposes of the present invention. Combinations of two or more pigments may be desirable for certain purposes.

The screens of the present invention can be constructed in a manner quite analogous so far as mechanical details are concerned to that used in making calcium tungstate screens. A thin uniform coating of the fluorescent material suspended in a solution of the binder and a suitable solvent is applied to a sheet of the supporting material by any convenient means. The coating solution may, for example, be flowed over the surface of the supporting material, or it may be spread over the surface with the aid of a doctor knife, or it may be applied by a combination of these methods. A protective coating of plastic is then applied over the fluorescent coating, e.g., by applying a solution of the binder or some other polymeric substance and allowing it to dry or, alternatively, by applying a pre-formed film of a moisture-impermeable plastic such as polyethylene terephthalate ("Mylar") or polyvinylidine chloride ("Saran") to the fluorescent coating with the aid of a suitable adhesive. The purpose of this protective coating is to seal the fluorescent coating against moisture and air and to protect it against mechanical abrasion. The art of coating sheet materials is well known and requires no further description or explanation here.

The supporting material to which the fluorescent coating is applied may be any one of a number of materials such as cardboard, plastic, glass, or the like. Glass and plastic provide a smooth base for the coating, but they are also more expensive. Cardboard, particularly laminated cardboard such as Bristol board and the like, is economical, flexible, and is the material most commonly employed for this purpose. If desired, cardboard which has been faced on one or both sides with aluminum foil can be used as the supporting material. The foil helps to seal the fluorescent coating against moisture and absorbs little if any of the useful incident radiation. If an aluminum faced cardboard is not used, it may be desirable to precoat the cardboard with a pigmented undercoating to increase the reflectivity and smoothness of the surface to which the fluorescent coating is to be applied. For example, a cellulose butyrate "dope" pigmented with titanium dioxide provides a satisfactory base for the fluorescent coating. The base coating may also be a combination of binder and pigment as used for the other coatings but without the activated iodide. It will be understood that such precoatings are to be considered a part of the supporting material rather than a part of the fluorescent coating.

The choice of the binder used for the fluorescent coating is of some importance. It should not absorb the light emitted by the activated iodide. It should of course be compatible with the iodide and should be free from residual catalysts or other substances which might decompose the iodide. It should be flexible and not given to cracking or checking, and it should be durable and abrasion resistant since surface imperfections are a common source of screen difficulties. If the same substance is to be used both as a binder and as a protective coating over the fluorescent coating, it should be substantially impervious to air and moisture so as to provide a protective shield for the iodide. It should preferably be substantially soluble in non-polar aromatic or aliphatic solvents which are compatible with iodides and in which the iodide is substantially insoluble. In general, highly polar solvents such as ketones, alcohols, and esters are less desirable since ordinary commercial grades usually contain appreciable amounts of water and therefore tend to have a deleterious effect on the iodide. If used, care must be taken to see that such solvents are dry and free from harmful impurities. Exemplary polymers which are satisfactory and useful both as binders and as protective materials for the purposes of the present invention are polymethyl methacrylate, and similar polymers of this type such as polyethyl methacrylate, polyisobutyl methacrylate and poly-n-butyl methacrylate, polystyrene, polyvinyl acetate and polyvinyl chloride. Either the same or different polymers may be used for the base coating, the fluorescent coating and the overcoating. Also two or more of these polymers, e.g., polymethyl methacrylate and polystyrene, may sometimes be combined advantageously in the same coating. Cellulose derivatives such as cellulose nitrate, cellulose acetate, cellulose acetate-butyrate, and the like, are usually less desirable since they are more permeable to moisture and require the use of polar solvents for the preparation of solutions; but with suitable precautions even these polymers are useful and in some cases, especially in the case of cellulose acetate-butyrate, they offer certain advantages which justify the greater care their use requires.

Ideally the iodide particles should be arranged as compactly as possible within the fluorescent coating. The binder and pigment should be present only in such quantities as are necessary to bind the iodide particles to the supporting material and fill the interstices among the particles. The pigment should preferably be of a particle size smaller than that of the iodide. These objectives may, for example, be achieved to a practical extent by initially using an amount of binder in the fluorescent coating sufficient to bind the particles of pigment and iodide to the supporting material but insufficient to fill the interstices between the particles completely. After the freshly applied fluorescent coating has set but before it is completely dry, additional coatings of unpigmented binder are applied until the interstices are entirely filled with the binder. Of particular advantage in this connection is a binder which shrinks on drying and thereby tends to pull the fluorescent particles more closely together. An example of such a material is cellulose acetate-butyrate. Using it as the binder, fluorescent coatings having a maximum concentration of alkali metal iodide per unit volume of coating have been prepared. Because of its relatively greater permeability to moisture, cellulose acetate-butyrate is less satisfactory for use in the protective coating and therefore other more impermeable plastics are preferable for that purpose. Finally, a protective coating is applied over the entire surface of the screen. This may be provided for example by applying additional coatings of the unpigmented binder. The protective coating should ordinarily be just thick enough to insulate the iodide against air and moisture. A protective coating about 0.5–1 mil in thickness is usually adequate. After the screen has been cut to the desired final size, the cut edges may be provided with a similar coating to protect any exposed iodide.

Screens having exceptional durability and resistance to moisture can be prepared by laminating a pre-formed film of a water-impermeable plastic such as polyethylene terephthalate or polyvinylidene chloride to the exposed surface of the fluorescent coating. The plastic film may be laminated to the fluorescent coating by first moistening the coating with a solvent for the binder and then pressing the plastic film against it. Somewhat better results are obtained with the aid of a suitable pressure-sensitive adhesive. In that case either the film or the coating or both are coated with the liquid adhesive, allowed to dry, and the film and coating are then united under pressure to form a smooth bond. This method of protecting the fluorescent iodide coating is particularly valuable when a relatively moisture-permeable material such as cellulose acetate-butyrate is used as the binder for the fluorescent iodide. The method also permits the use of exceptionally moisture-impermeable plastic materials such as polyethylene terephthalate and polyvinylidene chloride for which suitable iodide-compatible solvents are not readily available. The method is not limited to the use of these particular plastics, however, and other preformed plastic films, e.g., polyethylene film, may be employed.

Since the iodides are sensitive to moisture, acids, and oxidizing agents, certain precautions are advisable to avoid excessive deterioration of the iodide during fabrication of the screen. All materials used for preparing the coating solutions should be free from such deleterious substances and the equipment used should be dry and clean. In addition, the inclusion of a small amount of an iodide stabilizer such as sodium or potassium thiosulfate in the fluorescent coating provides further protection. The fluorescent coating may also contain small amounts of dispersing agents, plasticizers, or other auxiliary substances having no direct effect on the resolving power or the speed of the screen but which help to improve the uniformity and smoothness of the fluorescent coating. Where an iodide which is particularly sensitive to moisture, such as sodium iodide, is utilized, it is desirable to carry out the processing operations in an atmosphere having a low moisture content.

The fluorescent coating may be of any desired thickness. Increasing the thickness of this coating tends to increase speed and decrease resolution whereas decreasing the thickness tends to increase resolution and decrease speed. The most generally useful thickness appears to be about 6–8 mils, but coatings having a thickness of 3–4 mils or less or 10 mils or more may be useful under certain conditions.

It is desirable to avoid using an excessive amount of pigment in the fluorescent coating since such an excess results only in reducing the speed of the screen without improving the sharpness of the resolution. The most useful concentrations appear to lie in the range of 5–10% based on the weight of the activated iodide. Addition of a pigment has been found to have a beneficial effect on resolution over a wider range, however, e.g., from about 3% up to about 25% based on the weight of the iodide, although the effect is not usually optimal outside the narrower range.

The particle size of the iodide is not critical for the broad purposes of the present invention. For maximum resolution the particles of iodide should be smaller than the limit of resolution. Iodide having a particle size range of approximately 1–5 microns has been found to be quite satisfactory.

Ideally the particle size of the pigment should be smaller than that of the iodide so that it can occupy the voids between the iodide particles without separating them. However, the particle size of the pigment is not a critical factor, and material which has been finely ground in conventional equipment for milling fine powders is satisfactory.

The following examples illustrate the invention.

*Example 1*

A fluorescent coating composition for an iodide screen pigmented with zirconium dioxide was prepared according to the following formula:

| | | |
|---|---|---|
| Thallium-activated potassium iodide | g | 200 |
| Zirconium dioxide | g | 18 |
| Polymethylmethacrylate | g | 26.8 |
| Sodium thiosulfate | g | 2 |
| Toluene | ml | 100 |
| Butyl benzyl phthalate | ml | 9.6 |

The mixture was milled on a ball mill using solid glass spheres until the insoluble components were finely and uniformly dispersed in the liquid medium.

This composition was applied to Bristol board by conventional means to give a fluorescent coating 6–7 mils thick when dried. The Bristol board had previously been given a base coat of cellulose butyrate "dope" pigmented with titanium dioxide (either rutile or anatase is satisfactory for this purpose), then coated with polystyrene dissolved in a mixture of toluene and acetone to promote a firm bond between the supporting material and the fluorescent coating. The supporting material with its base coatings was thoroughly dried before the fluorescent coating was applied. Before the fluorescent coating was completely dry, successive thin coats of polystyrene dissolved in toluene were applied until all the remaining interstices in the fluorescent coating were filled and there was a thin film of polystyrene about 1 mil thick over the entire surface of the screen. Instead of polystyrene, polymethylmethacrylate could be used for the finish coating.

An X-ray intensifying screen was thereby obtained which required less than one-fourth as much radiation at a peak voltage of 70 kv. as a commercial medium speed calcium tungstate screen to give photographic images of equal optical density. The resolving powers of the two screens were indistinguishable.

*Example 2*

A fluorescent coating composition similar to that described in Example 1 but containing a greater proportion of zirconium dioxide was prepared according to the following formula:

| | | |
|---|---|---|
| Thallium-activated potassium iodide | g | 200 |
| Zirconium dioxide | g | 36.2 |
| Polystyrene | g | 27.6 |
| Polymethylmethacrylate solution | ml | 33.5 |
| Sodium thiosulfate | g | 2 |
| Toluene | ml | 221 |
| Butyl benzyl phthalate | ml | 3 |

The polymethylmethacrylate solution was prepared by dissolving 33 g. of the polymer in 150 ml. of toluene.

A screen was prepared as described in Example 1 using the above composition. The resolution obtainable with this screen was comparable to that obtained with the screen described in Example 1 but the speed was somewhat slower. However, the screen was still 3–4 times as fast as a commercial medium-speed calcium tungstate screen.

*Example 3*

A fluorescent coating composition similar to that described in Example 1 but containing calcium tungstate as the pigment in place of zirconium dioxide was prepared according to the following formula:

| | | |
|---|---|---|
| Thallium-activated potassium iodide | g | 200 |
| Calcium tungstate | g | 20 |
| Polymethylmethacrylate | g | 26.8 |
| Sodium thiosulfate | g | 2 |
| Toluene | ml | 100 |
| Butyl benzyl phthalate | ml | 9.6 |

An X-ray intensifying screen made in the manner described in Example 1 but with this coating composition, was approximately as fast as the screen described in Example 1 and gave equally sharp and clear resolution of fine details.

*Example 4*

A fluorescent coating composition similar to that described in Example 1 but containing calcium titanate as the pigment in place of zirconium dioxide was prepared according to the following formula:

| | | |
|---|---|---|
| Thallium-activated potassium iodide | g | 200 |
| Calcium titanate | g | 20 |
| Polymethylmethacrylate | g | 26.8 |
| Sodium thiosulfate | g | 2 |
| Toluene | ml | 100 |
| Butyl benzyl phthalate | ml | 9.6 |

An X-ray intensifying screen made in the manner described in Example 1 but using this coating composition, was comparable to a screen prepared using the coating composition described in Example 3.

Example 5

Another coating composition containing calcium tungstate as the pigment was prepared according to the following formula:

| | | |
|---|---|---|
| Thallium-activated potassium iodide | g | 200 |
| Calcium tungstate | g | 40 |
| Polystyrene | g | 27.6 |
| Polymethylmethacrylate solution (33 g. in 150 ml. toluene) | ml | 33.5 |
| Sodium thiosulfate | g | 2 |
| Toluene | ml | 216 |

A screen prepared in the manner described in Example 1 but using this composition, was slower than the screen described in Example 3 but still substantially faster than a commercial medium-speed calcium tungstate screen.

Example 6

A fluorescent coating composition containing the anatase form of titanium dioxide as the pigment was prepared according to the following formula:

| | | |
|---|---|---|
| Thallium-activated potassium iodide | g | 200 |
| Anatase | g | 12.5 |
| Polystyrene | g | 30.6 |
| Polymethylmethacrylate solution (33 g. in 150 ml. of toluene) | ml | 33.5 |
| Sodium thiosulfate | g | 2 |
| Toluene | ml | 221 |
| Butyl benzyl phthalate | ml | 3 |

A screen prepared in the manner described in Example 1 but using this composition, was comparable to a commercial medium-speed calcium tungstate screen with respect to resolution of fine details but was 3–4 times faster.

Example 7

A fluorescent coating composition similar to that described in Example 5 but containing a lesser proportion of anatase was prepared according to the following formula:

| | | |
|---|---|---|
| Thallium-activated potassium iodide | g | 200 |
| Anatase | g | 6.3 |
| Polystyrene | g | 32 |
| Polymethylmethacrylate solution (33 g. in 150 ml. of toluene) | ml | 33.5 |
| Sodium thiosulfate | g | 2 |
| Toluene | ml | 216 |

A screen was prepared using this composition by the method described in Example 1. Resolution of details was substantially improved over that obtained using an unpigmented iodide screen and the speed was 3–4 times faster than that of a commercial medium-speed calcium tungstate screen.

Example 8

Another fluorescent coating composition containing the anatase form of titanium dioxide as the pigment was prepared according to the following formula:

| | | |
|---|---|---|
| Thallium-activated potassium iodide | g | 200 |
| Anatase | g | 50 |
| Polystyrene | g | 21.6 |
| Polymethylmethacrylate solution (33 g. in 150 ml. of toluene) | ml | 33.5 |
| Sodium thiosulfate | g | 2 |
| Toluene | ml | 216 |

Using this composition a screen was prepared by the method described in Example 1. Resolution was comparable to that obtained using the screen described in Example 6 but the speed was slower. This screen was approximately 2½ times faster than a commercial medium-speed calcium tungstate screen.

Example 9

A fluorescent coating composition containing the rutile form of titanium dioxide as the pigment was prepared according to the following formula:

| | | |
|---|---|---|
| Thallium-activated potassium iodide | g | 200 |
| Rutile | g | 50 |
| Polystyrene | g | 24 |
| Polymethylmethacrylate solution (33 g. in 150 ml. of toluene) | ml | 33.5 |
| Sodium thiosulfate | g | 2 |
| Toluene | ml | 216 |

Following the method described in Example 1, an X-ray intensifying screen was prepared using this composition. The screen was approximately 1½ times as fast as a commercial medium-speed calcium tungstate screen. Resolution was comparable to that of the screen described in Example 8. The speed could be increased substantially by decreasing the above proportion of rutile, which represents a useful but not optimal quantity, and still retain the desirable improvement in resolution over that characteristic of unpigmented screens.

Example 10

A fluorescent coating composition containing zinc oxide as the pigment was prepared according to the following formula:

| | | |
|---|---|---|
| Thallium-activated potassium iodide | g | 200 |
| Zinc oxide | g | 35.6 |
| Polystyrene | g | 27.6 |
| Polymethylmethacrylate solution (33 g. in 150 ml. of toluene) | ml | 33.5 |
| Sodium thiosulfate | g | 2 |
| Toluene | ml | 216 |

Following the method described in Example 1, an X-ray intensifying screen was made using this composition. Resolution was comparable to that obtained with the screen described in Example 7 but the speed was somewhat slower.

Example 11

A fluorescent coating composition containing magnesium oxide as the pigment was prepared according to the following formula:

| | | |
|---|---|---|
| Thallium-activated potassium iodide | g | 200 |
| Magnesium oxide | g | 23.7 |
| Polymethylmethacrylate solution (33 g. in 150 ml. of toluene) | ml | 33.5 |
| Polystyrene | g | 32 |
| Sodium thiosulfate | g | 2 |
| Toluene | ml | 216 |

X-ray screens prepared in the manner described in Example 1 but using this composition, showed noticeable improvement in resolution compared with iodide screens which contain no pigment and had equivalent speed.

Example 12

A fluorescent coating composition was prepared according to the following formula:

| | | |
|---|---|---|
| Thallium-activated potassium iodide | g | 200 |
| Zirconium oxide | g | 18 |
| Poly-n-butylmethacrylate | g | 14.8 |
| Sodium thiosulfate | g | 6 |
| Xylene | ml | 136 |
| Butyl benzyl phthalate | ml | 14.5 |

X-ray intensifying screens prepared in the manner described in Example 1 but using this composition, were comparable to those described in that example.

Example 13

A fluorescent coating composition was prepared according to the following formula:

| | | |
|---|---|---|
| Thallium-activated potassium iodide | g | 200 |
| Zirconium oxide | g | 18 |
| Polyethylmethacrylate | g | 26.8 |
| Sodium thiosulfate | g | 2 |
| Toluene | ml | 180 |
| Butyl benzyl phthalate | ml | 9.6 |

X-ray intensifying screens prepared in the manner described in Example 1 but using this composition, were comparable to those described in that example.

When thallium-activated sodium iodide is substituted for the thallium-activated potassium iodide in the above formula, the same proportions of components are preferably employed but additional precautions are preferably utilized. Thallium-activated sodium iodide has a greater sensitivity to moisture than thallium-activated potassium iodide and therefore the preparation of the coating composition and its use in preparing X-ray intensifying screens should be carried out in a dry atmosphere.

Example 14

A screen prepared using cellulose acetate-butyrate as the binder for the fluorescent salt and protected front and back with a protective film of polyethylene terephthalate ("Mylar") was prepared as follows:

A coating solution having the following composition was prepared:

| | | |
|---|---|---|
| Thallium-activated potassium iodide | g | 400 |
| Zirconium oxide | g | 37.6 |
| Sodium thiosulfate anhydrous | g | 29.5 |
| Cellulose acetate-butyrate | g | 53.7 |
| Solvent | ml | 500 |

The solvent had the following composition:

| | Parts by volume |
|---|---|
| Acetone | 235 |
| Methyl isobutyl ketone | 180 |
| Amyl acetate | 90 |
| N-butyl alcohol | 90 |
| Xylene | 405 |

A coating of uniform thickness of the dispersion was applied to a sheet of cellulose acetate (0.015 in. thick) by conventional coating techniques to give a fluorescent coating which when dry had a thickness of 0.005–0.006 in.

Two sheets of 0.001 in. polyethylene terephthalate film were prepared by coating one side with a pressure-sensitive adhesive ("Bondmaster L440") using a doctor blade set at .010 in. The adhesive was allowed to dry and the coated plastic sheets were united to the front and back of the fluorescent screen by passing the assembled screen and plastic films through pressure rollers.

For additional protection, narrow strips of the plastic film, coated with adhesive as described above, were used to seal the edges of the screen.

Screens prepared in this manner were exposed to a humidity of 79% or more for periods as long as five weeks without their showing any evidence of moisture penetration as indicated by the appearance of yellowish spots in the fluorescent coating. With regard to speed and quality of the photographic images obtained with their use, screens prepared in the manner described above were entirely comparable to screens prepared by the methods hereinbefore described.

While thallium-activated potassium iodide is preferred because of its availability and relative ease of handling, other activated alkali metal iodides which fluoresce when exposed to X-rays and which emit light of a wave length to which photographic film is particularly sensitive, are also useful.

The intensifying screens of this invention are primarily intended for medical radiography, but they are also useful in certain kinds of industrial radiographic techniques.

In view of the above, it will be seen that the several objects of the invention are achieved and other advantageous results attained.

As various changes could be made in the above products and methods without departing from the scope of the invention, it is intended that all matter contained in the above description or shown in the accompanying drawings shall be interpreted as illustrative and not in a limiting sense.

We claim:

1. An X-ray intensifying screen comprising a sheet of substantially X-ray transparent supporting material and a fluorescent coating therefor, said coating comprising a major proportion of a thallium-activated alkali metal iodide and a minor proportion but not less than about 3%, based upon the weight of said iodide, of a pigment having a refractive index not substantially less than 1.7 and low absorptivity for light in the blue-violet-ultraviolet region of the spectrum.

2. An X-ray intensifying screen comprising a sheet of substantially X-ray transparent supporting material and a fluorescent coating therefor, said coating comprising a major proportion of a thallium-activated alkali metal iodide and a minor proportion but not less than about 3%, based upon the weight of said iodide, of a pigment having a refractive index not substantially less than 1.7 and low absorptivity for light in the blue-violet-ultraviolet region of the spectrum, and an organic polymeric binder.

3. An X-ray intensifying screen comprising a sheet of substantially X-ray transparent supporting material and a fluorescent coating therefor, said coating comprising a major proportion of a thallium-activated alkali metal iodide and a minor proportion but not less than about 3%, based upon the weight of said iodide, of a pigment having a refractive index not substantially less than 1.7 and low absorptivity for light in the blue-violet-ultraviolet region of the spectrum, an organic polymeric binder, and a thin moisture-impermeable film over the external surface of said fluorescent coating.

4. An X-ray intensifying screen comprising a sheet of substantially X-ray transparent supporting material and a fluorescent coating therefor, said coating comprising thallium-activated potassium iodide, said coating also comprising for each 100 parts by weight of activated iodide from about 3 to 25 parts by weight of a pigment having a refractive index not substantially less than 1.7 and low absorptivity for light in the blue-violet-ultraviolet region of the spectrum, and a sufficient quantity of an organic polymeric binder to bind the iodide and pigment to the supporting material and provide a thin moisture-imperable film over the external surface of said fluorescent coating.

5. An X-ray intensifying screen comprising a sheet of substantially X-ray transparent supporting material and a fluorescent coating therefor, said coating comprising thallium-activated potassium iodide, said coating also comprising for each 100 parts by weight of activated iodide from about 3 to 25 parts by weight of a pigment having a refractive index not substantially less than 1.7 and low absorptivity for light in the blue-violet-ultraviolet region of the spectrum, a sufficient quantity of an organic polymeric binder to bind the iodide and pigment to the supporting material, and a thin moisture-impermeable film of a polymeric material over the surface of said fluorescent coating.

6. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground zirconium oxide, and a sufficient quantity of an organic polymeric binder to fill the interstices among the particles of iodide and pigment and provide a thin moisture-impermeable film over the external surface of said fluorescent coating.

7. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground zirconium oxide, a sufficient quantity of an organic polymeric binder to fill the interstices among the particles of iodide and pigment, and a thin moisture-impermeable film of a polymeric material over the surface of said fluorescent coating.

8. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground titanium dioxide, and a sufficient quantity of an organic polymeric binder to fill the interstices among the particles of iodide and pigment and provide a thin moisture-impermeable film over the external surface of said fluorescent coating.

9. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground calcium tungstate, and a sufficient quantity of an organic polymeric binder to fill the interstices among the particles of iodide and pigment and provide a thin moisture-impermeable film over the external surface of said fluorescent coating.

10. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground calcium titanate, and a sufficient quantity of an organic polymeric binder to fill the interstices among the particles of iodide and pigment and provide a thin moisture-impermeable film over the external surface of said fluorescent coating.

11. An X-ray intensifying screen comprising a sheet of substantially X-ray transparent supporting material and a fluorescent coating therefor, said coating comprising a compact layer approximately 3–10 mils in thickness of discrete particles of thallium-activated potassium iodide, said layer of particles having interspersed therein for each 100 parts by weight of activated iodide from about 3 to about 25 parts by weight of finely ground zinc oxide, and a sufficient quantity of an organic polymeric binder to fill the interstices among the particles of iodide and pigment and provide a thin moisture-impermeable film over the external surface of said fluorescent coating.

12. An X-ray intensifying screen comprising a sheet of substantially X-ray transparent supporting material and a fluorescent coating therefor, said coating comprising a compact layer approximately 3–10 mils in thickness of discrete particles of an activated alkali metal iodide selected from the group consisting of thallium-activated potassium iodide and thallium-activated sodium iodide, said layer of particles having interspersed therein for each 100 parts by weight of activated iodide from about 3 to about 25 parts by weight of finely ground pigment selected from the group consisting of zirconium oxide, titanium oxide, calcium tungstate, calcium titanate, magnesium oxide, zinc oxide, fluorescent barium lead sulfate and fluorescent zinc sulfide, a sufficient quantity of a binder, comprising at least one organic polymer selected from the group consisting of polyethylmethacrylate, polyisobutylmethacrylate, polymethylmethacrylate, poly-n-butylmethacrylate, polystyrene, polyvinyl acetate and polyvinyl chloride, to fill the interstices among the particles of iodide and pigment, and a thin moisture-impermeable film, comprising at least one polymeric material selected from the group consisting of polyethylmethacrylate, polyisobutylmethacrylate, polymethylmethacrylate, poly-n-butylmethacrylate, polystyrene, polyvinyl acetate, polyvinyl chloride, polyethylene terephthalate, polyvinylidene chloride and polyethylene, over the external surface of said fluorescent coating.

13. The method of making an X-ray intensifying screen which comprises coating a sheet of supporting material with a suspension of a mixture of a thallium-activated alkali metal iodide and a finely ground pigment having a refractive index not substantially less than 1.7 and low absorptivity for light in the blue-violet-ultraviolet region of the spectrum, in a liquid vehicle comprising an organic polymeric binder in an inert organic solvent for the binder, the dry volume of the polymeric binder being insufficient to fill the voids in a dry mixture of the iodide and pigment, allowing a portion of the solvent to evaporate, and applying successive coatings of an organic polymeric binder until the interstices among the iodide and pigment particles are substantially completely filled and there is a thin film of the polymeric binder over the external surface of the coating.

14. The method of making an X-ray intensifying screen which comprises coating a sheet of supporting material with a suspension of a mixture of a thallium-activated alkali metal iodide and a finely ground pigment having a refractive index not substantially less than 1.7 and low absorptivity for light in the blue-violet-ultraviolet region of the spectrum, in a liquid vehicle comprising an organic polymeric binder in an inert organic solvent for the binder, the dry volume of the polymeric binder being insufficient to fill the voids in a dry mixture of the iodide and pigment, allowing a portion of the solvent to evaporate, applying successive coatings of an organic polymeric binder until the interstices among the iodide and pigment particles are substantially completely filled, and applying a thin film of a polymeric material over the external surface of the coating.

15. The method of making an X-ray intensifying screen which comprises coating a sheet of supporting material with a suspension of a mixture of approximately 100 parts by weight of an activated alkali metal iodide and approximately 3–25 parts by weight of a finely ground pigment having a refractive index not substantially less than 1.7 and low absorptivity for light in the blue-violet-ultraviolet region of the spectrum, in a liquid vehicle comprising approximately 5–20 parts by weight of an organic polymeric binder in an inert organic solvent for the binder, the dry volume of the polymeric binder being insufficient to fill the voids in a dry mixture of the iodide and pigment, allowing a portion of the solvent to evaporate, and applying successive coatings of an organic polymeric binder until the voids among the iodide and pigment particles are substantially completely filled and there is a thin film of the polymeric binder over the external surface of the coating.

16. The method of making an X-ray intensifying screen which comprises coating a sheet of supporting material with a suspension of a mixture of approximately 100 parts by weight of thallium-activated potassium iodide and approximately 3–25 parts by weight of zirconium oxide in a liquid vehicle comprising approximately 5–20 parts by weight of a methacrylate polymer in an aromatic hydrocarbon solvent, the dry volume of the methacrylate polymer being insufficient to fill the voids in a dry mixture of the iodide and pigment, allowing a portion of the solvent to evaporate, and applying successive coatings of an organic polymer until the voids among the iodide and pigment particles are substantially completely filled and there is a thin film of the polymeric binder over the external surface of the coating.

17. The method of making an X-ray intensifying screen which comprises coating a sheet of supporting material with a suspension of a mixture of approximately 100 parts by weight of thallium-activated potassium iodide and approximately 9 parts by weight of finely ground zirconium oxide suspended in a liquid vehicle comprising approximately 15 parts by weight of a methacrylate polymer in an aromatic hydrocarbon solvent, allowing a portion of the solvent to evaporate, and applying successive coatings of polymethylmethacrylate until it substantially completely fills the voids among the iodide and pigment particles and there is a thin film of the polymer over the external surface of the coating.

References Cited in the file of this patent

UNITED STATES PATENTS

| | | |
|---|---|---|
| 2,651,584 | Longini et al. | Sept. 8, 1953 |
| 2,819,183 | Alles | Jan. 7, 1958 |
| 2,851,612 | Davey | Sept. 9, 1958 |
| 2,912,589 | Dybvig | Nov. 10, 1959 |